No. 674,883. Patented May 28, 1901.
A. U. SMITH.
WEIGHT AND PRICE INDICATING SCALE.
(Application filed Mar. 9, 1900.)
(No Model.) 6 Sheets—Sheet 1.

Witnesses:
K. E. Kochner
L. D. Heller

Inventor:
Albert U. Smith
By 
his Atty

No. 674,883. Patented May 28, 1901.
A. U. SMITH.
WEIGHT AND PRICE INDICATING SCALE.
(Application filed Mar. 9, 1900.)
(No Model.) 6 Sheets—Sheet 2.

Witnesses:
H. W. Thayer.
L. D. Keller.

Inventor.
Albert U. Smith.
by Hale Kochne
his Atty.

No. 674,883. Patented May 28, 1901.
A. U. SMITH.
WEIGHT AND PRICE INDICATING SCALE.
(Application filed Mar. 9, 1900.)
(No Model.) 6 Sheets—Sheet 3.

Witnesses:
H. W. Thayer.
K. E. Koehne

Inventor:
Albert U. Smith
By his Atty.

No. 674,883. Patented May 28, 1901.
A. U. SMITH.
WEIGHT AND PRICE INDICATING SCALE.
(Application filed Mar. 9, 1900.)

(No Model.) 6 Sheets—Sheet 4.

Witnesses:
H. W. Thayer
K. E. Koehne

Inventor,
Albert U. Smith
By Hale Koehne
his Atty.

THE NORRIS PETERS CO., PHOTO-LITHO., WASHINGTON, D. C.

No. 674,883. Patented May 28, 1901.
A. U. SMITH.
WEIGHT AND PRICE INDICATING SCALE.
(Application filed Mar. 9, 1900.)

(No Model.) 6 Sheets—Sheet 5.

Witnesses:
H. W. Thayer
K. E. Koehne

Inventor:
Albert U. Smith
By Jahr Koehne
his Atty.

No. 674,883. Patented May 28, 1901.
A. U. SMITH.
WEIGHT AND PRICE INDICATING SCALE.
(Application filed Mar. 9, 1900.)
(No Model.) 6 Sheets—Sheet 6.

Witnesses: Inventor:
K. E. Kochne Albert U. Smith
L. D. Heller By Hale Kochne
his Atty

UNITED STATES PATENT OFFICE.

ALBERT U. SMITH, OF SAUGATUCK, CONNECTICUT, ASSIGNOR TO THE COMPUTING SCALE COMPANY, OF DAYTON, OHIO.

WEIGHT AND PRICE INDICATING SCALE.

SPECIFICATION forming part of Letters Patent No. 674,883, dated May 28, 1901.

Application filed March 9, 1900. Serial No. 8,021. (No model.)

*To all whom it may concern:*

Be it known that I, ALBERT U. SMITH, of Saugatuck, county of Fairfield, and State of Connecticut, have invented a certain new and useful Improvement in Weight and Price Indicating Scales; and I do hereby declare that the following is a full, clear, and exact description thereof, reference being had to the accompanying drawings, in which like numerals refer to like parts.

This invention relates to improvements in weight and price indicating scales in general, and specifically to that class illustrated in my Letters Patent No. 545,616, of April 3, 1895, reissued, No. 11,536, April 28, 1896, as well as in my Letters Patent No. 597,300, dated January 11, 1898.

My present invention has for its object the providing of means applicable to all scales employing springs for adjustment of the mechanism of said spring or springs to compensate for the variations in temperature. So far as I am aware I am the first in the art to devise, construct, and use such means or mechanism, and the broader claims thereon are not to be restricted in their scope to any particular or specific form of apparatus, but to all forms embodying means for adjusting the mechanism or the spring to compensate for the different degrees of temperature, however widely they may differ in construction.

In the drawings, Fig. 10½ is a top plan view of one end of the scale-casing with the controller removed. Fig. 11½ is an enlarged bottom plan view of the scale-suspending means.

Figures 27, 28:
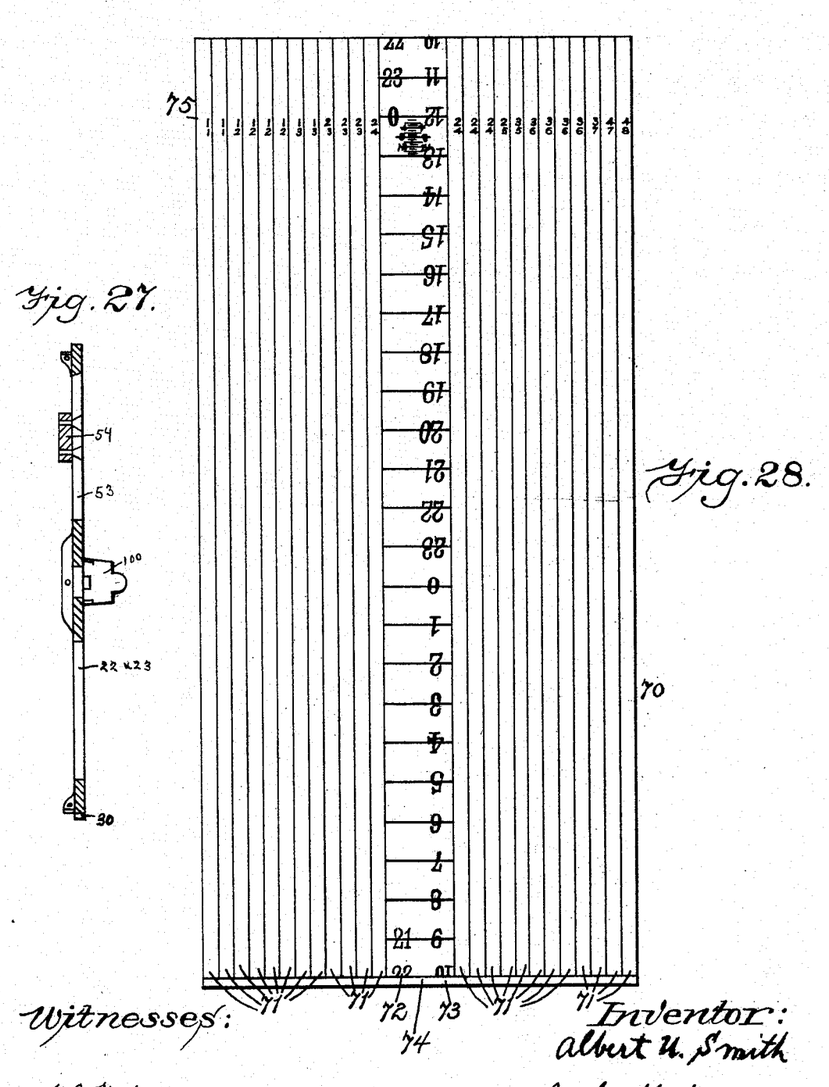
Fig. 27 is a sectional view, on line Y Y of Fig. 11, of the end-frame casting.
Fig. 28 is a plan view of the flat sheet which is rolled to form the periphery of the indicator-drum.

The general construction and operation of the scale are set forth in the aforesaid Letters Patent, and it is unnecessary to say more about the parts of said scale set forth in the aforesaid Letters Patent than that 10 and 11 indicate the draft-bars, respectively connected to springs 12 and 13, the lower ends of said draft-bars 10 and 11 being connected to the opposite ends of a horizontal bar 14, having a weight-receiving hook or member 15, rigidly secured at the center of its length intermediate said draft-bars 10 and 11. Parallel with said bar 14 is a supplemental bar 16, preferably bifurcated at its opposite ends to engage said draft-bars 10 and 11, said bar 16 being loosely engaged by a projection of said hook or member 15. Pivotally mounted near the ends of the said bar 16 are vertical arms 17, having racks 18 upon their upper ends meshing with pinions 19, secured to the spindle of the indicator-cylinder, provided with revoluble bearings in projections 20, removably attached to lugs 21 upon each of the cast end frames 22 and 23, Figs. 10, 11, and 27, said end frames 22 and 23 having their peripheries connected to opposite ends of a cylindrical casing 24, provided with a slot 25 in its front face extending substantially the length of the indicating-cylinder for exposing the weights and prices of loads and with a relatively narrow exposing-opening 26 in the rear face thereof for exposing to view only the weight of loads suspended from the hook or receiver 15.

I will now proceed to describe the points, constructions, and combinations of novelty possessed by my present invention.

Figure 14:
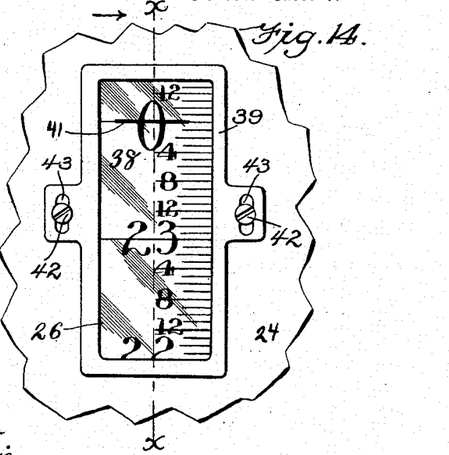
Fig. 14 is an enlarged front elevation of the exposing-opening, through which only the weight of the load is indicated, the adjacent portion of the casing being broken away.
Figure 24:
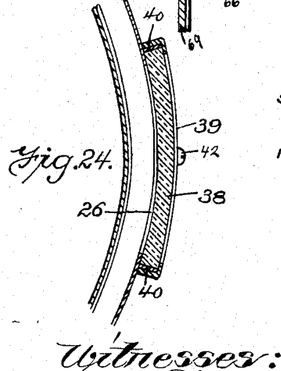
Fig. 24 is a reduced sectional side elevation on line X X of Fig. 14.

The periphery of each of the end frames 22 and 23, adjacent the slot 25, is provided with an arc-shaped recess 30, in which is mounted an arc-shaped strip of glass or other transparent material directly beneath and covering said opening 25. Said glass portion 31 is less in width than the extent of said slots 30 and is secured at a desirable point in said slots 30 by means of substantially U-shaped portions 32, Figs. 11, 17, and 18, and being arc-shaped to embrace said glass portion 31 between its arms, said portion 32 being secured in the instance shown to the inner edge of each of the end frames 22 and 23 by a screw or bolt 33, secured to one part and engaging in a slot 34 in the other part, said bolt 33 and slot 34 being adapted to permit the adjustment of said portions 32, so that said glass portion 31 will occupy different positions in said slots 30, so that the character-designating means upon said glass portion 31 may be adjusted to designate the character or characters indicating the true weight or value. Said character-designating means consists in the instance shown of a slot 35, Figs. 10, 17, and 18, formed through paper or other opaque material 36, secured to the inner face of the glass portion 31, said slots 35 extending over all the characters indicating the price of articles at different rates per unit, while a designating line or pointer 37, Figs. 1 and 10, also secured to said glass, projects over and serves to designate the weight-indicating characters exposed through said glass 31. The exposing-opening 26 is covered by an arc-shaped glass 38, mounted in an arc-shaped frame 39, with strips 40 of cushioning material interposed between the edges of said glass 38 and said frame 39, Figs. 24 and 26, to prevent the breakage of said glass 38, while said glass is provided with a designating line or pointer 41, adapted to designate the correct weight-indicating characters indicated through said glass 38, and said line or pointer 41 is adapted to be adjusted by the adjustment of the frame 39, in which glass 38 is mounted, said adjustment being by means of screws 42 passing through slots 43 in said frame 39 and into the casing 24. (See Figs. 14, 24, and 26.)

Figure 10:
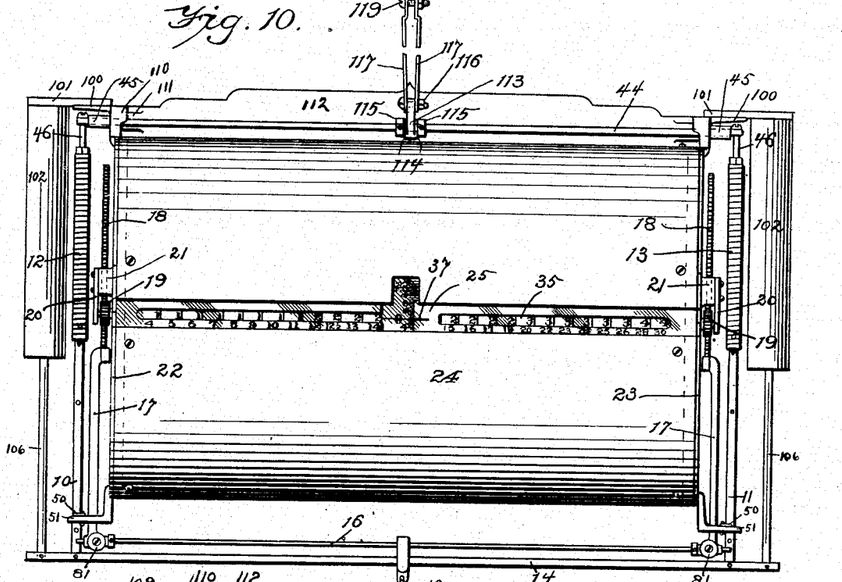
Fig. 10 is a front view of a scale similar to Fig. 1, but having the end covers of the casing removed and having the front top plate removed to expose the supporting-rod at the top of the scale.
Figures 25, 26:
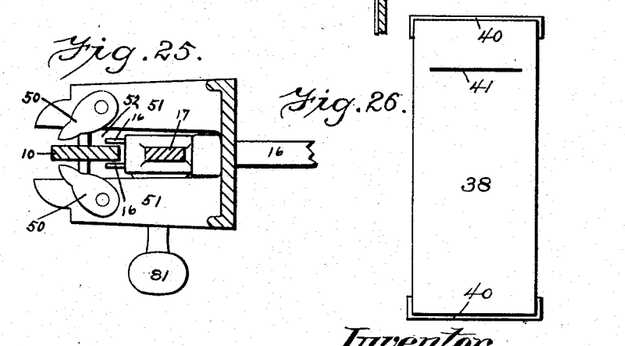
Fig. 25 is an enlarged sectional plan view on line X X of Fig. 11.
Fig. 26 is a front elevation of the glass employed in the indicator shown in Figs. 24 and 14.

The end frames 22 and 23 are loosely pivoted at or near their tops upon a rod 44, having collars 45 thereon intermediate said end frames 22 and 23 and the projections 46, passing loosely through the ends of said shaft 44 and securing the springs 12 and 13 to said rod 44, so that said frames 22 and 23 are loosely suspended from said rod 44, as are also the springs 12 and 13 from a different point on said rod 44, so that the entire scale-casing, composed of the end frames 22 and 23, and the cylinder 24 and the parts secured thereto are perfectly free to vibrate upon their suspending-rod 44 as a pivot, which vibration is limited by projections 50, Figs. 10 and 25, adjustably mounted upon extensions 51 at the bottom of each of said frames 22 and 23, said projections 51 being each provided with a vertical slot 52 for the accommodation of the draft-bars 10 and 11 and the upright bars 17. Projections 50 preferably have pointed ends adjustable toward said draft-bars 10 and 11 for the purpose of limiting said vibration of said scale-casing. (See Figs. 10, 11, and 25.) For the purposes of securing the proper adjustment of the vertical gravity-plane of the end frames 22 and 23 and the parts swinging therewith readily and without undue skill or manipulation, so that said parts can be manufactured in quantities and then be adjusted so that said vertical gravity-plane of said parts will pass through the center of the length as well as of the width of their suspending-rod 44, the center of said indicating-cylinder and springs 12 and 13, and the center of said rods 14 and 16, I provide either or both of said end frames 22 and 23 with a slot or guide 53, Figs. 11 and 27, at an angle to said gravity-plane, and in said guide or slot 53 of each of said frames 22 and 23 I adjustably mount a weight 54, the adjustment of which closer to or farther from the said vertical gravity-plane correspondingly adjusts said vertical gravity-plane until it is in the correct position, where the weight of the parts on each side of said vertical gravity-plane will be identical and no friction will be caused between the portions 50 and the draft-bars 10 and 11, or either of them, and by independently suspending the springs and the casing from the same pivotal point the objection due to the load upon the springs vibrating and causing the casing and draft-bars to bind in structures where the springs are suspended from the casing is obviated.

Figures 10, 11:
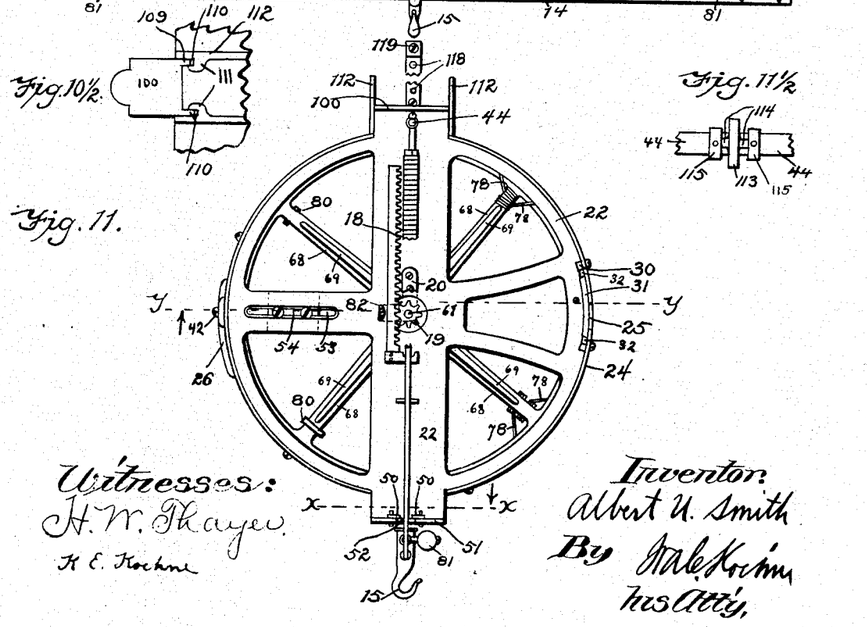
Fig. 11 is a side elevation of Fig. 10 with the end controller removed and the front top plate added.
Figures 12, 13:
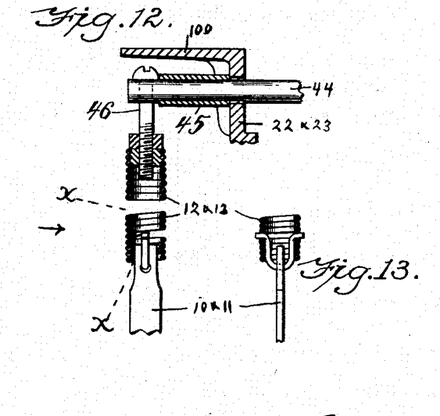
Fig. 12 is a central vertical sectional detail view of a portion of the spring and its supporting and connecting means.
Fig. 13 is a sectional view on line X X of Fig. 12.
Figures 15, 16, 17, 18:
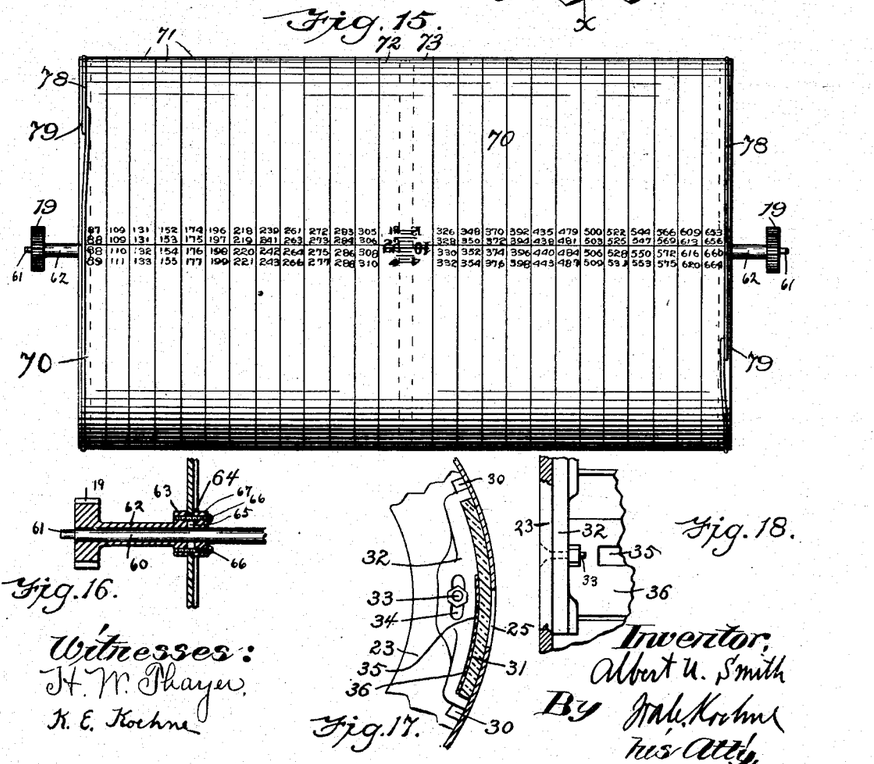
Fig. 15 is a plan view of the indicator-drum.
Fig. 16 is a sectional detail view of one end of the spindle of the indicator-drum, showing the pinion and the manner of securing said pinion to said drum.
Fig. 17 is a sectional side elevation in detail of a portion of the end frames and outer casing, showing the means for adjustably mounting the glass over the opening that exposes the weights and prices of the loads.
Fig. 18 is a side elevation of the parts shown in Fig. 17 looking from the left.
Figures 19, 20, 21, 22, 23:
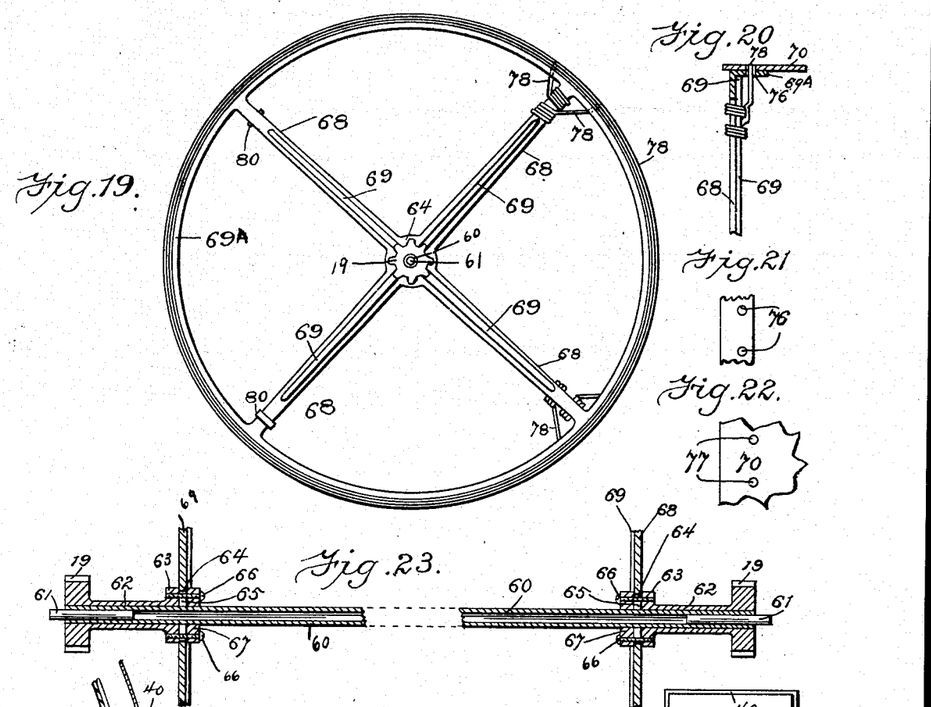
Fig. 19 is an end view of the indicator-drum.
Figs. 20, 21, and 22 illustrate details of construction thereof.
Fig. 23 illustrates a central vertical sectional view through the indicator-spindle, the central portion thereof being broken away.

The indicating-cylinder is formed with a spindle 60, which may be either a thin rod or tube, but preferably a tube, as shown in Fig. 23, provided with bearings 61 at opposite ends of reduced diameter, and where said spindle 60 is formed of a thin tube said end bearings 61 are formed of pins driven into the opposite ends of said tube. The pinions 19 are driven onto or otherwise secured to the opposite end of said spindle 60 and are provided with hubs 62, having flanged end projections 63 fitting against webs 64, provided with slots 65, through which pass screws 66 to confine said webs 64 between the face of said collars 63 and a washer 67, Figs. 16 and 23. Said webs 64 are formed of an equal number of thin light arms 68, each having a rib 69 extending substantially its length, and said arms 68 are connected at their outer ends to a substantially L-shaped periphery 69ᴬ, Figs. 19 and 20. Upon the periphery of and extending between said portions 69ᴬ and rolled into the form of a cylinder is a sheet of paper or other light material 70, which when absorbent is preferably coated on both sides with moisture-resisting material, Figs. 15, 19, 20, and 28, and provided with a series of rows of characters 71, indicating the prices of loads at different rates per unit, and in the instance shown with two rows 72 and 73 of weight-indicating characters, the row 73 extending in the reverse direction to the row 72, and when rolled upon the peripheries of said portions 69ᴬ the rows 72 and 71 of characters are adapted to be indicated through the slot 25, while the row 73 of characters is adapted to be indicated through the slot 26 in the cylindrical casing 24. On one end of said sheet 70 is a strip 74, Fig. 28, in the instance shown provided with no graduations, so that the opposite end of said sheet 70 may overlap said strip 74 for the purpose of securing the opposite ends of sheet 70 together to form a cylinder. The zero-point or point of beginning for each of the rows 71 and 72 of characters is at the point indicated at 75 in Fig. 28, which is intermediate the opposite ends of said sheet 71 and that said row 73 of characters beginning at a point likewise intermediate the opposite ends of said sheet 70, which ends are joined together to form a cylinder at a point, in the instance shown in Fig. 28, twenty-two pounds removed from zero with respect to the rows of characters 71 and 72, so that should an inartistic joint be formed between the ends of said sheet 70 it will not be ordinarily exposed through the indicating-slots or remain exposed through them, as is the case when such joint is formed at the zero position. To secure said sheet 70 to the peripheries of said portions 69ᴬ, I form openings 76 through the peripheries of each of said portions 69ᴬ in the instance shown, one opening on each side of the arms 68 thereof, and through said sheet 70 I form registering openings 77. As shown in Fig. 15, near or at the opposite ends of the cylindrical sheet 70 I wrap a coil of light fine wire 78, so as to bind the cylindrical sheet 70 near their opposite ends to the peripheries of said portions 69ᴬ, the opposite ends of said wires 78 overlapping each other, as shown at 79 in Fig. 15, and passing through said registering openings 77 and 76 and coiled to the adjacent arms 68, as shown in Figs. 11, 19, and 20. As shown in said figures, the point at which the opposite ends of said wires 78 pass through the cylindrical sheet 70 and are wrapped about the adjacent arms 68 are at different points in the arc of the circle, so as to distribute the slightly-increased weight caused thereby, and to compensate for such increased weight and at the same time to form a means for adjusting the longitudinal center of gravity of said indicator to coincide with its axis of rotation I adjustably mount upon one or more of the arms 68 weights 80, Figs. 11 and 19, which weights 80 may be adjusted closer to or farther from the center of rotation of said indicating-cylinder to change its center of gravity to coincide with said axis of rotation, which adjustment may be made very readily and cheaply and enabling the indicating-cylinders and the parts thereof to be made in large quantities with the employment of only ordinary skill and at the same time enabling the adjustment of the center of gravity of said indicator readily by comparatively unskilled persons to coincide with its axis of rotation to enable it to be revolved upon its axis uniformly and without influencing the counterbalance members or springs 12 and 13. In the instance shown in the drawings said weights 80 are formed of bands of soft material surrounding said arms 68 and sliding thereon to correct said center of gravity when said weights 80 are adapted to be pinched or clamped by tweezers or other simple tool, so as to firmly bind against said arms 68 and be retained in position.

The uprights 17, pivotally mounted upon opposite ends of the rod 16 and having the racks 18 secured to the upper ends thereof, are provided with weighted arms 81, projecting from said pivotal point at substantially a right angle and in the direction toward which the teeth of the racks 18 face, (see Figs. 10, 11, and 25,) so that said weighted arms 81 cause said racks 18 to incline toward and keep at all times in engagement with the pinion 19 and out of engagement with the portion 82, Fig. 11, of projection 20 which extends behind each of said rack-bars 18 to prevent said rack-bars from moving out of mesh with their pinion 19.

Figure 1:
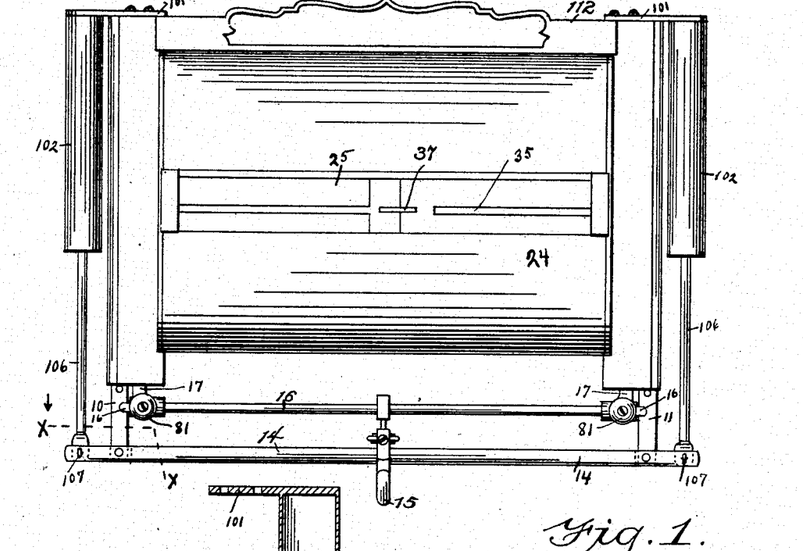
Figure 1 illustrates a front elevation of a scale embodying my invention.
Figure 2:
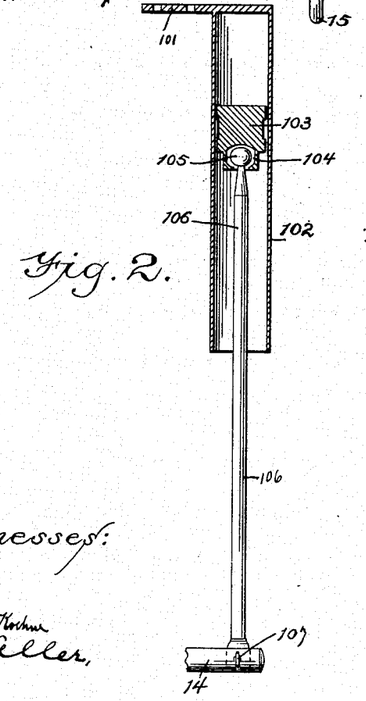
Fig. 2 is an enlarged central vertical sectional view of one of the draft-bars and indicator-controllers.
Figure 3:
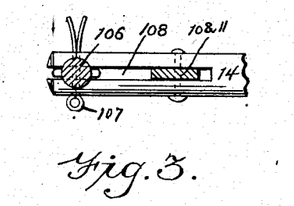
Fig. 3 is an enlarged sectional plan view on line X X of Fig. 1.

The upper end of each of the end frames 22 and 23 is provided with a lateral extension 100, to each of which projections 100 is removably secured by screws or otherwise the lateral foot 101 of a downwardly-projecting open-mouthed tube or cylinder 102, Figs. 1, 4, 5, and 10. The vertical axes of said tubes 102 are in the same vertical plane with the counterbalance members or springs 12 and 13, the points of suspension of said springs or members and the scale-casing, and the point of connection of draft-bars 10 and 11 with rod 14, and the point of application of the load to the receiver or hook 15. In each of said tubes 102 is slidingly mounted a piston 103, provided with a circular recess 104 in their lower ends receiving the ball end 105 of connecting-rod 106, pivotally and removably connected at their lower ends by cotter-pins 107 or otherwise to the opposite ends of the rod 14, which opposite ends of said rod 14 are provided with a slot 108, in which the lower ends of said connections 106 and draft-bars 10 and 11 are pivotally mounted. The upward-and-downward movement of the bar 14 and its connected parts causes pistons 103 to move correspondingly upward and downward in said tubes or cylinders 102 to respectively compress and rarefy the air in said tubes 102 between said pistons 103 and the closed upper end or head of said cylinders 102 for the purpose of controlling and regulating the movement of the bar 14 and its connected parts and steadying the movement of the indicating-cylinder in driving connection with said rod 14. The inner faces of both of said projections 100 of the end frames 22 and 23 are provided on opposite sides with lugs 109, adapted to fit into slits 110, formed by L-shaped projections 111 at the opposite ends of the top, front, and back plates 112, Figs. 1, 10, 10½, and 11, which plates 112 are for the purpose of name-plates and to give a finished appearance to the scale and concealing the rod 44 from view, as shown in Fig. 1. In the center of the length of said rod 44 is mounted loosely thereon a vertical portion 113, provided on the under side of said rod 44 with projections 114, adapted to loosely engage collars 115, rigidly secured to said rod 44 on opposite sides of said portion 113 and adjacent the ends of the projections 114 for the purpose of enabling the upper end of said portion 113 to have a limited lateral movement between said collars 113 and at the same time prevent any lateral movement of said portion 113 at its point of contact with the bottom of said rod 44, so as to maintain at all times the vertical alinement between the point of contact of portion 113 against the bottom of rod 44 and the point of application of the load to the member or hook 15 and in the same plane with the axis of the tubes or controllers 102 and the springs or counterbalance members 12 and 13. To the upper end of portion 113 and on opposite sides thereof are secured by bolt 116 flexible strips 117, provided throughout their lengths with oppositely-located bolt-openings 118 for the reception of a bolt 119 to adjustably support said scale to a convenient point of support. As shown in Figs. 4, 5, 6, 7, and 8, the upper end of said hook or member 15 is provided with a vertical slot 120, in which is mounted to slide vertically a block 121, provided with a horizontal opening 122 therethrough, said opening 122 being provided with tapering edges 123 for loose contact with the rod 16. Through the top wall of said slot 120 is an opening, through which passes a screw 124, rigidly secured to the top of said block 121, on the upper end of which screw 124 is mounted a nut 125, adapted to engage with the upper end of said member or hook 15 to draw said block 121, with its rod 16, farther from or closer to the rod 14, as the case may be, for varying the position of the indicator with reference to the counterbalance members or springs 12 and 13, and through a side wall of said slot 120 is passed a screw 126, adapted to engage and clamp said block 121 in its adjusted position in said slot, while a screw 127 passes through said hook or member 15 to clamp the same to the center of said rod 14.

Figure 4:
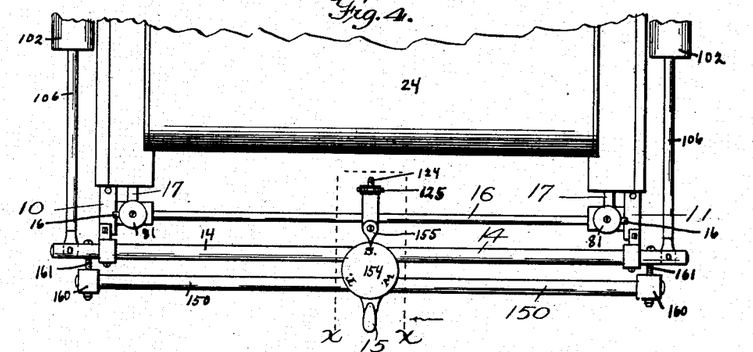
Fig. 4 is a front elevation of the lower portion of the scale shown in Fig. 1, having added thereto the means for accommodating the mechanism and springs to different degrees of temperature.
Figures 5, 6, 7, 8, 9:
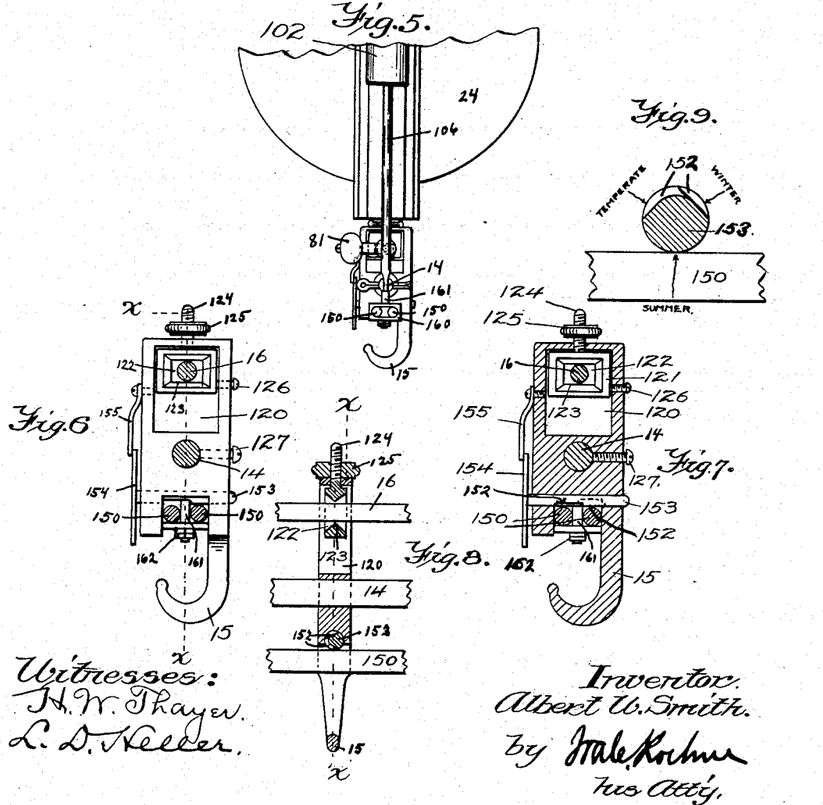
Fig. 5 is an end view of the parts shown in Fig. 4.
Fig. 6 is an enlarged elevation on line X X of Fig. 4.
Fig. 7 is a sectional view on line X X of Fig. 8.
Fig. 8 is a sectional view on line X X of Fig. 6.
Fig. 9 is a diagrammatic enlarged front sectional view of the cam and spring-bars of the means for accommodating the mechanism to different degrees of temperature.

I will now proceed to describe the means I have employed in the instance shown in the drawings for adjusting the mechanism to compensate for variations due to changes in temperature, reference being had to Figs. 4, 5, 6, 7, 8, and 9. The bar 14 is a long relatively thin spring-bar pivotally connected near its opposite ends to the draft-bars 10 and 11 and having a load receiver or hook 15, rigidly secured in the center of its length intermediate the points of connection with said draft-bars 10 and 11 and loosely connected to the center of the length of the rod 16, on whose opposite ends are pivoted the indicator-driving uprights 17, all as aforesaid, and by reason of the sliding engagement between the opposite ends of said bar 16 and the meshing of the racks 18 with pinions 19, rigidly secured to the indicator-drum, said rod 16 at all times remains in a perfectly horizontal position at a distance from the center of the length of the bar 14 fixed by the position of the block 121 or by that portion of hook or member 15 which engages with said rod 16. When a load is suspended from the receiver or hook 15, the center of the spring-bar 14 yields downward a distance proportionate to the weight of said load, carrying bodily downward the horizontal rod 16 a like distance, which drives the indicator a proportionate distance, and by reason of the elongation of the springs 12 and 13 in counterbalancing said load said bars 14 and 16 are bodily moved downward a further distance, equal or proportionate to the elongation of said springs 12 and 13, and drive said indicator a further proportionate distance, so that, as is apparent from the foregoing, the spring-bar 14, transmitting the load to the springs or counterbalancing members 12 and 13, forms a part of said counterbalancing means in the instance shown in the drawings. When the temperature is cold, the springs expand less than when the temperature is warm, and said expansion increases as the temperature increases, and the means I have devised compensate for such variations, so that an accurate scale is obtained at any ordinary temperature. In the instance shown in the drawings said means for compensating for the aforesaid variations consists of one or more bars or members 150, connected at their opposite ends to the opposite ends of the bar 14, the center of said bars 150 passing loosely through a slot 151 in said member or hook 15 and is adapted to be engaged by a projection or projections 152 upon a shaft 153, provided with bearings in said hook or member 15. On the outer end of said shaft 153 is rigidly secured an indicator-disk 154, marked with the different seasons—such as "Summer," "Winter," and "Temperate," as shown in Figs. 4 and 9, or with the correspondingly different degrees of temperature, as may be desired, which different seasons or degrees of temperature are adapted to be designated by a pointer 155, rigidly secured to said hook or member 15.

In the summer or at the highest temperature the cam 152 is adapted to contact with the centers of all the rods 150 to render the connection between the counterbalance members or springs 12 and 13 the most rigid and prevent almost wholly the spring of said rods 150 and 14, and the increased expansion of the springs or members 12 and 13 is compensated for by the reduction or elimination of the flexibility of said connection (rods 150 and 14) between said springs or members 12 and 13. As the temperature changes to temperate said cam 152 is set to render said connection intermediate said springs or members 12 and 13 less rigid. During winter said bars 150 hang loosely from said bar 14 and are not engaged by cam 152, which enables said bar 14 to add all its flexibility to the elongation of the springs in order to compensate for the reduced expansion of said springs to produce accurate results. In the specific structure shown in the drawings said rods 150 are two in number, arrayed side by side and having their opposite ends mounted in frames 160, secured to the ends of rod 14 by bolts 161, passing through said rods 14 and frames 160 and between said rods 150, while lock-nuts 162, Fig. 6, upon said bolts 161 maintain uniform distances apart the ends of said rods 14 and 150.

In summer or hot weather the periphery of shaft 153 is adapted to contact with the tops of both spring-bars 150, so that when an article to be weighed is suspended from hook or member 15 the load will be transmitted by the three spring-bars 14 and 150, acting together as one comparatively rigid bar to the load-counterbalancing members or springs, while in temperate weather only one of said spring-bars 150 is engaged by the periphery of shaft 153 by reason of the recess 152 therein, so that said bar 12 and one of said bars 150 add their elasticity to that of the counterbalance members or springs in counterbalancing the load, while in winter or cold weather the periphery of shaft 153 does not touch either of the bars 150 by reason of the two recesses 152 registering with and extending into each other, so that the spring-bar 14 will add all its elasticity to that of the counterbalancing members of springs in counterbalancing the load, and under each of the aforesaid conditions of temperature the degree of elasticity of the counterbalancing members or springs and said spring-bars is equal for a given load, which load is indicated by the indicator driven from the center of the length of said spring-bars 14 and 150, as aforesaid, so that the uniform elasticity may be communicated to the indicator at the point of greatest advantage, as if the indicator be driven from a point at the ends of said rod 14 the elasticity of said rods 14 and 150 will be unavailing. The ends of rods 16 are bifurcated and slide over the draft-bars 10 and 11 during the varying elasticities of said rod 14, aided by said spring-rods 150, as aforesaid.

It is perfectly obvious that if desired the disk 154 may be in the form of a designating-hand 155, rigidly secured to and revoluble with the shaft 153, and that numerous other alterations of the construction, form, and arrangement of the parts may be made without departure from the scope and spirit of this invention.

The cylinders 102, it will be observed, are removably attached outside of the other portions of the scale mechanism and, furthermore, that the lower ends of the piston-rods are connected with the bar 14, so as to be readily detachable therefrom. Thus said parts may be readily separated for cleaning, oiling, or repairing. The piston-rod may be separately detached from the draft mechanism, the piston drawn out, and the parts cleaned with the greatest facility without disturbing or disconnecting the other scale mechanism.

Having thus described my invention, what I claim as new, and desire to secure by Letters Patent, is—

1. In a scale, the combination of the load-counterbalancing springs, means for applying load to said springs, a spring-bar intermediate said load-applying means and said springs, an indicator, means for driving said indicator connected centrally to said spring-bar, and manually-adjustable means independent of the load for varying the degree of flexure of said spring-bar, substantially as specified.

2. In a scale, the combination of the load-counterbalancing springs, means for applying load to said springs, a spring-bar intermediate said load-applying means and said springs, an indicator, means for driving said indicator connected centrally to said spring-bar, and means including a manually-adjustable cam for varying the degree of flexure of said spring-bar, substantially as specified.

3. In a scale, the combination of the load-counterbalancing springs, means for applying load to said springs, a spring-bar intermediate said load-applying means and said springs, an indicator, means for driving said indicator connected centrally to said spring-bar, means including a manually-adjustable cam for varying the degree of flexure of said spring-bar, and an indicator adjustable proportionate to said cam for indicating its proper adjustment at different temperatures, substantially as specified.

4. In a scale, the combination of the load-counterbalancing springs, means for applying load to said springs, spring-bars, an indicator, means for driving said indicator connected centrally to one of said spring-bars, and manually-adjustable means for varying the degree of flexure of said spring-bars for accommodating different temperatures; substantially as specified.

5. In a scale, the combination of the load-counterbalancing springs, means for applying load to said springs, a spring-bar, an indicator, means for driving said indicator connected centrally to said spring-bar, and a manually-adjustable cam for varying the degree of flexure of said spring-bar for accommodating different temperatures, substantially as specified.

6. In a scale, the combination of the load-counterbalancing springs, means for applying load to said springs, a spring-bar, an indicator, means for driving said indicator connected centrally to said spring-bar, means including a manually-adjustable cam for varying the degree of flexure of said spring-bar for accommodating different temperatures, and an indicator adjustable proportionate to said cam for indicating its proper adjustment at different temperatures, substantially as specified.

7. In a scale, the combination of the load-counterbalancing springs, means for applying load to said springs, an indicator, a driving connection between said indicator and said springs, manually-adjustable means for compensating for variations in the elongation of the springs under tension due to change of temperature to which said load-counterbalancing springs may be subject and an indicator for indicating the adjustment, substantially as specified.

8. In a scale, the combination of the load-counterbalancing springs, means for applying load to said springs, an indicator, a driving connection between said indicator and said springs, and means including a manually-adjustable cam for compensating for variation in the elongation of the springs under tension, due to change of temperature to which said load-counterbalancing springs may be subjected, substantially as specified.

9. In a scale, the combination of the load-counterbalancing springs, means for applying load to said springs, an indicator, a driving connection between said indicator and said springs, means including a manually-adjustable cam for compensating for variation in the elongation of the springs under tension, due to change of temperature to which said load-counterbalancing springs may be subject, and an indicator actuated by said cams for indicating the said adjustment of said cam, substantially as specified.

10. In a scale, the combination with the springs and rack-bars at opposite ends, a cylindrical indicator mounted between said springs and rack-bars at opposite ends, a bar between and connected to said springs, an independent bar between and connected to said rack-bars, said independent bar being loosely connected at its center to said first bar; means for applying load to said second bar; a third bar connected at its ends to said first bar; and adjustable means intermediate the ends of said first and third bars to cause said third bar to act or fail to act with said first bar, substantially as specified.

11. In a scale, the combination with the springs and rack-bars at opposite ends, a cylindrical indicator mounted between said springs and rack-bars at opposite ends, a bar between and connected to said springs, an independent bar between and connected to said rack-bars, said independent bar being loosely connected at its center to said first bar; means for applying load to said second bar; third and fourth bars connected at their ends to said first bar; and a manually-adjustable cam intermediate said first and third and fourth bars to cause said third bar and fourth bars to act or fail to act with said first bar, substantially as specified.

12. In a scale, the combination with the springs and rack-bars at opposite ends, a cylindrical indicator mounted between said springs and rack-bars at opposite ends, a bar between and connected to said springs, an independent bar between and connected to said rack-bars; said independent bar being loosely connected at its center to said first bar; means for applying load to said second bar; a third bar connected at its ends to said first bar; a manually-adjustable cam intermediate the ends of said first and third bars to cause said third bar to act or fail to act with said first bar, and an indicator for indicating the position of said cam, substantially as specified.

13. In a scale, the combination with the springs and rack-bars at opposite ends, a cylindrical indicator mounted between said springs and rack-bars at opposite ends, a bar between and connected to said springs, an independent bar between and connected to said rack-bars, said independent bar being loosely connected at its center to said first bar; means for applying load to said second bar; downwardly-projecting open-mouthed tubes at opposite ends of said scale with their longitudinal centers in the same vertical plane with said springs, pistons slidable in the bores of said tubes, pitmen pivotally connected at their upper ends to said pistons by means of balls formed upon the upper ends of said pitmen and bearing in sockets formed in the lower ends of said pistons, said pitmen being pivotally connected at their lower ends to the opposite ends of said first bar, substantially as specified.

14. In a scale, the combination of a casing, a revoluble indicator therein, an adjustable exposing-opening for exposing the indications on said indicator, a weight-counterbalancing member in driving connection with said indicator, a support and independent connections loose with respect to each other, between said casing and said member and the support whereby said casing and said member may vibrate independently with the support as an axis; substantially as specified.

15. In a scale, the combination of a cylindrical casing, a cylindrical indicator revolubly mounted therein and provided with a series of peripherical rows of price indications, an adjustable exposing-opening for exposing said indications on said indicator, a load-counterbalancing member near each end of said casing and in driving connection with said indicator, a load-receiver connected to said counterbalancing members, and a member extending across the top of said casing and to which said casing and counterbalancing members are loosely with respect to each other and independently suspended and constituting an axis about which said casing and said counterbalancing member may vibrate independently; substantially as specified.

16. In a scale, the combination of a casing, suspension means therefor, an indicator mounted in said casing, a draft-bar movable proportionate to the load applied thereto, means for applying a load to said draft-bar, a driving connection between said draft-bar and indicator, said draft-bar projecting through a slot in said casing, and means for adjusting the center of gravity of said casing to remain in a plane passing through the plane in which are said suspension means for the casing and said means for applying a load to the draft-bar, substantially as specified.

17. In a scale, the combination of a casing, a suspension means therefor, an indicator mounted in said casing, a draft-bar movable proportionate to the load applied thereto, means for applying a load to said draft-bar, a driving connection between said draft-bar and indicator, said draft-bar projecting through a slot in said casing, and a weight mounted within said casing and adjustable at an angle to the direction of movement of said draft-bar for adjusting the center of gravity of said casing to obviate frictional contact between said casing and draft-bar, substantially as specified.

18. In a scale, the combination of a casing, suspension means therefor, an indicator mounted in said casing, a draft-bar movable proportionate to the load applied thereto, means for applying a load to said draft-bar, a driving connection between said draft-bar and indicator, said draft-bar projecting through a slot in said casing, and weights mounted within said casing and upon opposite sides of its center of gravity and adjustable at an angle to the direction of movement of said draft-bar for adjusting the center of gravity of said casing, substantially as specified.

19. In a scale, the combination of a casing, an indicator revolubly mounted therein and provided with a series of rows of characters indicating prices at different rates per unit, load-counterbalancing means within said casing, a driving connection between said load-counterbalancing means and said indicator, means for independently suspending said casing and said load-counterbalancing means, and a weight adjustably secured to said casing for adjusting the center of gravity of said casing, substantially as specified.

20. In a scale, the combination of an indicator consisting of a plurality of circular webbed frames, a sheet of light material provided with a coat of moisture-resisting material, a plurality of rows of price indications at different rates per unit and running lengthwise of said sheet, each of said rows of indications beginning at a point different from the meeting edges of said sheet, the meeting edges of said sheet being secured together when said sheet is rolled in the form of a cylinder about the peripheries of said frames, and bands passing around said peripheries of said frames, substantially as specified.

21. In a scale, the combination of a casing, a load-counterbalancing means and an indicator mounted therein, a driving connection between said counterbalancing means and said indicator extending through a slot in said casing and adapted to connect said load-counterbalancing means with a load, a weight adjustably mounted upon said casing for adjusting the center of gravity of said casing, and a weight adjustably mounted upon said indicator for adjusting the center of gravity of said indicator to coincide with its axis of rotation, substantially as described.

22. In a scale, the combination of a casing, an indicator mounted within said casing and counterbalancing means, a driving connection between said counterbalancing means and said indicator, an exposing-opening in said casing through which indications upon said indicator are exposed, an arc-shaped transparent member covering said exposing-opening, a frame in which said member is mounted, means for adjustably securing said frame to the casing, and means adjustable with said frame and said transparent member for designating which of the indications exposed through said exposing-opening are to be read for the true indication, whereby the adjustment of said frame and said transparent member correspondingly adjusts said designating means and corrects the indication, substantially as described.

23. In a scale the combination with a casing, a draft member, a drum-indicator journaled in the casing, counterbalancing-springs located at opposite ends of the indicator-axis and a connection between the draft member and indicator whereby the indicator is rotated, of pneumatic dash-pot cylinders secured to the casing and located outside of the springs and in line with the axis of the drum, pistons in said cylinders and piston-rods detachably connected with the draft member; substantially as described.

24. In spring-scales, the combination with means for suspending the load, of counterbalancing-springs for the load-support and load, a regulating-spring connected therewith and means for regulating the flexure of said spring when load is applied and an indicator connected with the load-support; substantially as described.

25. In a scale embodying counterbalancing mechanism, and a load-support, the combination of a drum having computations of value thereon and formed of circular frames, a central spindle on which they are mounted, a sheet of flexible material on which the computations are marked, surrounding said circular frames and securing-bands passing around the flexible sheet and having their ends passed through the sheet and secured to the circular frames; substantially as described.

26. In a scale embodying counterbalancing mechanism and a load-support, the combination of a drum having computations of value thereon and formed of circular frames, a central spindle on which they are mounted, a sheet of flexible material on which the computations are marked, surrounding said circular frames in the form of a cylinder with registering openings in the sheet and peripheries of the frames and flexible bands passing around the cylinder and having their ends passed through the registering apertures and held within the cylinder; substantially as described.

27. In a scale, the combination of a casing, a cylindrical indicator within said casing and consisting of a shaft mounted in bearings within said casing, a plurality of light circular frames secured to said shaft, a sheet mounted upon the peripheries of said frames and having a plurality of peripherical rows of different indications, an exposing-opening extending longitudinally of this casing for exposing said rows of indications, a pinion rigid on said shaft intermediate said bearings, means for suspending said casing, means for counterbalancing the load and moving proportionate to the weight thereof, a draft-bar connected to said counterbalancing means and adapted to support the load, a rack connecting said draft-bar and pinion, pneumatic dash-pot cylinders removably secured at their closed ends to said casing and located on the outer sides of said load-counterbalancing means, said shaft, pinion and rack-bar being located between the said dash-pot cylinders, pistons in said dash-pot cylinders, end extensions on said draft-bar, and members pivotally connecting said pistons with said draft-bar end extensions; substantially as specified.

28. In a scale, the combination of a casing, a suspension means therefor, an indicator mounted in said casing, a draft-bar movable proportionate to the load applied thereto, means for applying a load to said draft-bar, a driving connection between said draft-bar and indicator, said draft-bar projecting through a slot in said casing, and a weight independent of but secured to said casing to adjust the center of gravity of said casing to obviate frictional contact between said casing and draft-bar, substantially as specified.

In witness whereof I have hereunto set my hand this 15th day of September, 1899.

ALBERT U. SMITH.

Witnesses:
RUFUS WAKEMAN,
GEORGE H. SLOVEN.